United States Patent
Ookawa

(10) Patent No.: US 7,574,612 B2
(45) Date of Patent: Aug. 11, 2009

(54) JOB EXECUTING UNIT POWER CONTROL SYSTEM

(75) Inventor: Hitoshi Ookawa, Tokyo (JP)

(73) Assignee: NEC Corporation, Tokyo (JP)

( * ) Notice: Subject to any disclaimer, the term of this patent is extended or adjusted under 35 U.S.C. 154(b) by 466 days.

(21) Appl. No.: 11/404,019

(22) Filed: Apr. 14, 2006

(65) Prior Publication Data

US 2006/0242646 A1 Oct. 26, 2006

(30) Foreign Application Priority Data

Apr. 20, 2005 (JP) .............................. 2005-122042

(51) Int. Cl.
G06F 1/26 (2006.01)
(52) U.S. Cl. ........................ 713/300; 713/320; 700/100; 700/102
(58) Field of Classification Search ................ 713/300, 713/320

See application file for complete search history.

(56) References Cited

U.S. PATENT DOCUMENTS

| | | | | |
|---|---|---|---|---|
| 4,718,007 | A * | 1/1988 | Yukino | 713/330 |
| 6,847,794 | B2 * | 1/2005 | Namura | 399/88 |
| 2004/0097218 | A1 * | 5/2004 | Vossler | 455/418 |
| 2004/0215985 | A1 * | 10/2004 | Armstrong et al. | 713/300 |
| 2006/0100982 | A1 * | 5/2006 | Cohn | 707/1 |

FOREIGN PATENT DOCUMENTS

| | | |
|---|---|---|
| JP | 58-168118 | 10/1983 |
| JP | 62-065119 | 3/1987 |
| JP | 5-19907 | 1/1993 |
| JP | 06-105463 | 4/1994 |
| JP | 09-282057 | 10/1997 |
| JP | 10-333767 | 12/1998 |
| JP | 2001-285543 | 10/2001 |
| JP | 2005-149106 | 6/2005 |

OTHER PUBLICATIONS

Japanese Office Action dated Mar. 24, 2009 with Partial Englsh Translation.

* cited by examiner

*Primary Examiner*—Nitin C Patel
(74) *Attorney, Agent, or Firm*—McGinn IP Law Group, PLLC

(57) ABSTRACT

A power control system includes power control target units, each of which has a power source and is used by at least one of jobs; job executing units configured to execute the jobs; and a power control unit configured to control the power source of each of the power control target units based on execution results of the jobs by the job executing units. The power control unit includes a job execution scheduling table generating section configured to generate a job execution scheduling table for each of the power control target units based on a control data, such that the job executing units execute the jobs in the job execution scheduling tables; a job execution scheduling table updating section configured to delete a job name of each of the jobs from the job execution scheduling tables when execution of the job is completed, and output a job completion notice; and a power off judging section configured to control the power sources of the power control target units used by the job to be turned off in response to the job completion notice.

19 Claims, 12 Drawing Sheets

Fig. 9A

141: POWER CONTROL SCHEDULE STORAGE SECTION

| START TIME | END TIME |
|---|---|
| EVERY DAY 18:00 | EVERY DAY 23:00 |

Fig. 9B

15: POWER OFF PERMISSION TIME ZONE STORAGE UNIT

| APPARATUS NO. | START TIME | END TIME |
|---|---|---|
| 1 | 18:00 | 23:00 |
| 2 | 18:00 | 23:00 |

Fig. 9C

SCHEDULE

| | JOB NAME | START TIME | END TIME | APPARATUS NO. OF APPARATUSES USED BY JOB | RETRY |
|---|---|---|---|---|---|
| 1 | A | 15:00 | 16:00 | 1 | YES |
| 2 | B | 18:00 | 19:00 | 1, 2 | YES |
| 3 | C | 20:00 | 21:00 | 1 | YES |

JOB EXECUTION RESULT

|   | JOB NAME | JOB STARTED TIME | JOB ENDED TIME | RESULT |
|---|---|---|---|---|
| 1 | A | 16:30 | 19:00 | SUCCESS |
| 2 | B | 18:15 | 22:00 | SUCCESS |
| 3 | C | 20:15 | 20:20 | FAILURE |
| 4 | C | 20:30 | 22:30 | SUCCESS |

JOB EXECUTING UNIT POWER CONTROL SYSTEM

BACKGROUND OF THE INVENTION

1. Field of the Invention

The present invention relates to a power control technique for controlling a power source of an apparatus used when a job executing unit executes a job.

2. Description of the Related Art

Conventionally, various kinds of power control techniques are known in relation to a job executing unit. In a most typical technique, the power source is turned on or off at a predetermined power on or power off time. In this technique, maximum processing times of all of jobs to be scheduled are predicted and a power off time is set based on the predicted time in order to prevent the power from being turned off during the execution of the job. Therefore, a heavy burden is loaded on an administrator and there is a possibility that the power is turned off during the execution of the job in case of erroneous prediction.

From these reasons, a proposal has been made in Japanese Laid Open Patent Publication (JP-A-Showa 58-168118: first conventional example), in which a timer control unit is provided to output a disconnection request signal when a current time indicates a predetermined power off time, and a disconnection permission signal outputting unit is provided to output a disconnection permission signal when there is no job on execution. A power source is turned off when the disconnection request signal is outputted and the disconnection permission signal is outputted. Thus, according to the first conventional example, the power is not turned off during the execution of the job. However, the power source cannot be turned off, if the time does not reach a predetermined power off time, even though all of the jobs to be scheduled are completed before the predetermined power off time. Thus, the power is unnecessarily consumed until the predetermined power off time.

Also, another conventional technique has been known in Japanese Laid Open Patent Publication (JP-A-Heisei 5-19907: second conventional example), in which the power source is not turned off, when a current time is immediately before a next power on time if even a power source turning-off factor is detected. Thus, according to the second conventional example, it is possible to avoid a situation in which a power on process cannot be carried out due to delay of a start time of a power off process, thereby preventing a system operation to be scheduled. However, in the second conventional example, there is no description of what are the power off factors.

In conjunction with the above description, a system power controller is disclosed in Japanese Laid Open Patent Publication (JP-A-Heisei 9-282057). In this conventional example of the system power controller, power supply to a computer system containing peripheral units is controlled. A resource control unit produces a power supply control plan every unit of the computer system based on a job execution plan and an operation result of the job. A job execution monitor section monitors an execution situation of the job to be executed by the computer system and notifies state data of each unit. A system control section corrects the power supply control plan based on the state data according to necessity and instructs power supply to each unit. A power supply control unit instructs the connection and disconnection of each unit in response to the instruction from the system control section, and the supply and non-supply of the power.

Also, a job execution time determining system of an automatic operation system is disclosed in Japanese Laid Open Patent Publication (JP-A-Heisei 10-333767). In this conventional example, the job execution time determining system includes an input unit, a processing unit for processing a data supplied from the input unit, a storage unit, a power control unit turns on/off a power supply of a computer based on the data, and a system clock to notify a time, a date. The processing unit includes the following units or sections. A system operation data registering section registers on the storage unit, system operation data containing a power on time and a power off time in units of months, weeks, and days from the input unit. A job data registering section registers on the storage unit, a job data containing resource data necessary to execute a job with an execution condition from the input unit. A calendar data registering section registers on the storage unit, a calendar data containing operation days and non-operation days of the computer in units of year, month, week, and day from the input unit. A schedule data generating section takes out the job data containing the execution condition from a date notified from the system clock and the calendar data from the storage unit, and registers on the storage unit, the job data containing the execution condition from a system operation time zone obtained from the system operation data. A job execution section executes a job with as execution condition, the time notified from the system clock and the time from the job data. A power supply control section instruct of supply and non-supply of power to the power control unit based on the power on time and power off time of the computer obtained from the system operation data.

SUMMARY OF THE INVENTION

An object of the present invention is to provide a power control system in which a situation that a power is turned off during execution of a job can be prevented.

Another object of the present invention is to provide a power control system in which any unnecessary power consumption can be prevented.

In an aspect of the present invention, a power control system includes power control target units, each of which has a power source and is used by at least one of jobs; job executing units configured to execute the jobs; and a power control unit configured to control the power source of each of the power control target units based on execution results of the jobs by the job executing units. The power control unit includes a job execution scheduling table generating section configured to generate a job execution scheduling table for each of the power control target units based on a control data, such that the job executing units execute the jobs in the job execution scheduling tables; a job execution scheduling table updating section configured to delete a job name of each of the jobs from the job execution scheduling tables when execution of the job is completed, and output a job completion notice; and a power off judging section configured to control the power sources of the power control target units used by the job to be turned off in response to the job completion notice.

Here, the control data may include a power control schedule and power control start and end time. The job execution scheduling table may store an identifier number of each of the power control target units used by the job, scheduled start and end times of execution of the job, and the job name.

Also, the power off judging section may not carry out the control of the power sources of the power control target units used by the job to be turned off when a time at which the job completion notice is received is out of a range of a power off permission start time to a power off permission end time.

Also, the power off judging section may control the power sources of the power control target units used by the job to be turned off in response to the job completion notice.

Also, the power off judging section may control the power sources of the power control target units used by the job to be turned off when a time at which the job completion notice is received is in a range of a power off permission start time to a power off permission end time.

Also, the power control apparatus may further include a job start pre-processing section configured to control the power source of the power control target unit to be turned on when execution of the job corresponding to the power control target unit is started.

Also, in another aspect of the present invention, a power control method is achieved by executing each of jobs based on a job execution scheduling table corresponding to the job; by using power control target units with power sources in each of the jobs; and by controlling the power source of each of the power control target units based on execution results of the jobs by the job executing units.

Here, the power control method may be achieved by further deleting a job name of each of the jobs from the job execution scheduling tables when execution of the job is completed; and issuing the job completion notice.

Also, the executing each of jobs may be achieved by generating the job execution scheduling table for each of the power control target units.

Also, the control data may include a power control schedule and power control start and end time, and the job execution scheduling table may store an identifier number of each of the power control target units used by the job, scheduled start and end times of execution of the job, and the job name.

Also, the controlling the power source may be achieved by issuing a job completion notice when execution of each of the jobs is completed; and by keeping the power sources of the power control target units used by the job when a time at which the job completion notice is received is out of a range of a power off permission start time to a power off permission end time.

Also, the controlling the power source may be achieved by issuing a job completion notice when execution of each of the jobs is completed; and by controlling the power sources of the power control target units used by the job to be turned off in response to the job completion notice.

Also, the controlling the power source may be achieved by issuing a job completion notice when execution of each of the jobs is completed; and by controlling the power sources of the power control target units used by the job to be turned off when a time at which the job completion notice is received is in a range of a power off permission start time to a power off permission end time.

Also, the power control method may be achieved by further controlling the power source of the power control target unit to be turned on when execution of the job corresponding to the power control target unit is started.

Also, a still another aspect of the present invention, a computer-readable software product for realizing a power control method which is achieved by executing each of jobs based on a job execution scheduling table corresponding to the job; by using power control target units with power sources in each of the jobs; and by controlling the power source of each of the power control target units based on execution results of the jobs by the job executing units.

BRIEF DESCRIPTION OF THE DRAWINGS

FIGS. 9A to 9C are diagrams showing the power control schedule storage section, the power off permission time zone storage unit, and a schedule of a job executing unit, respectively;

DESCRIPTION OF THE PREFERRED EMBODIMENTS

Hereinafter, a power control system according to the present invention will be described with reference to the attached drawings.

First Embodiment

Figure 1:
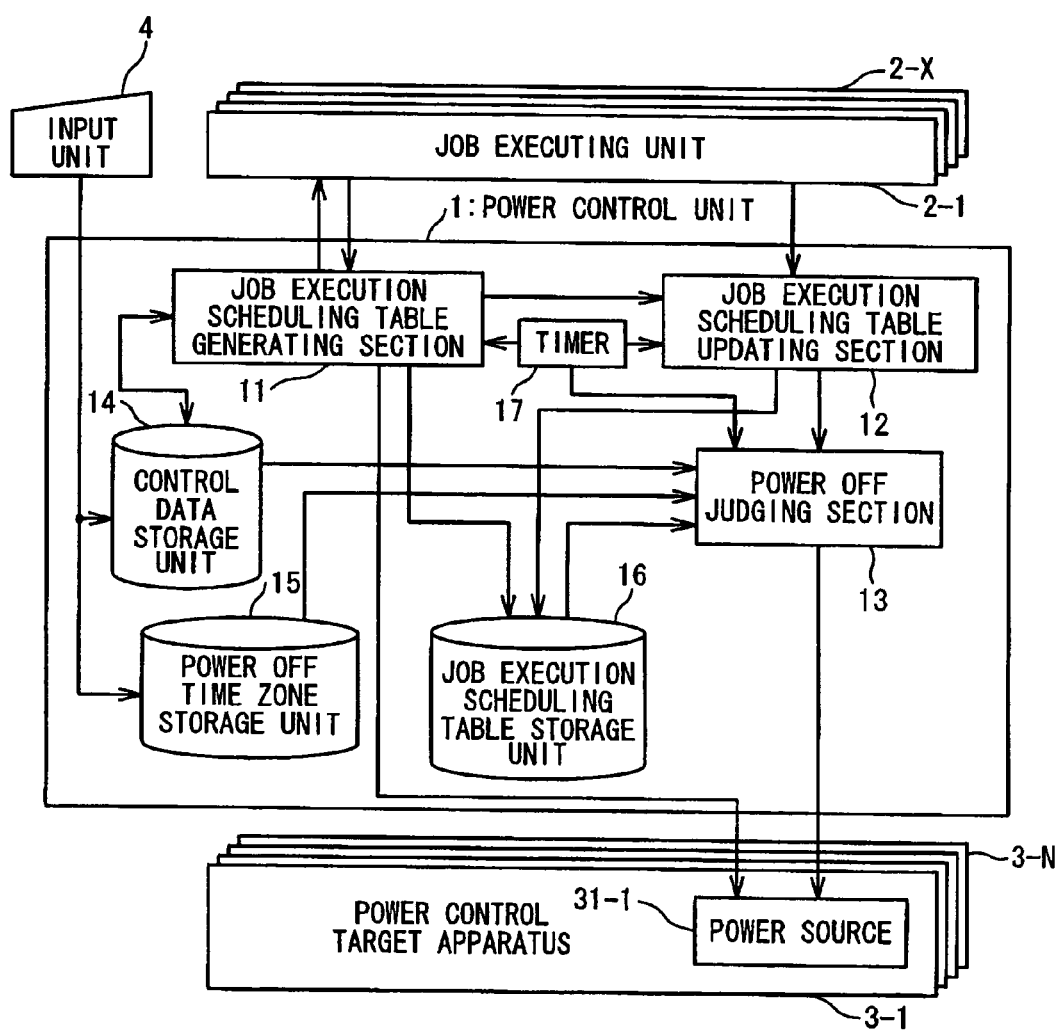
FIG. 1 is a block diagram showing a configuration of a power control system according to a first embodiment of the present invention.

FIG. 1 is a block diagram showing the configuration of the power control system according to the first embodiment of the present invention. Referring to FIG. 1, a power control system includes an input unit 4 such as a keyboard, job executing units 2-1 to 2-X (X is an integer of 1 or more) such as personal computers for execution of jobs, a power control unit 1, and power control target apparatuses 3-1 to 3-N (N is an integer of 1 or more).

The input unit 4 is used to input a power control schedule and a power off permission time zone of each of the power control target apparatuses 3-1 to 3-N in response to an instruction from an administrator. Each of the job executing units 2-1 to 2-X executes a job in accordance with a predetermined job schedule. The power control unit 1 is provided with a job execution scheduling table generating section 11, an job execution scheduling table updating section 12, a power off judging section 13, a control data storage unit 14, a power off time zone storage unit 15, an job execution scheduling table storage unit 16 and a timer 17 for displaying a date and a time at present. The power control target apparatuses 3-1 to 3-N are such as disk drives or tape devices used in the execution of the jobs by the job executing units 2-1 to 2-X. The power control target apparatuses 3-1 to 3-N are provided with power sources 31-1 to 31-N to be turned on or off in response to a power on command or a power off command from the power control unit 1. Here, in the first embodiment, the apparatus numbers "1" to "N" are allocated to the power control target apparatuses 3-1 to 3-N, respectively.

Figure 2:
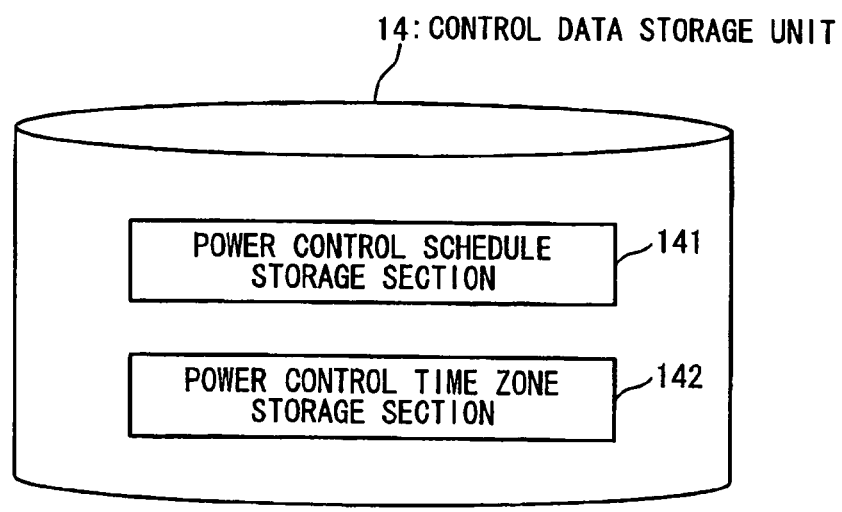
FIG. 2 is a diagram showing a configuration of a control data storage unit in the power control system of the first embodiment.

As shown in FIG. 2, the control data storage unit 14 in the power control unit 1 includes a power control schedule storage section 141 and a power control time zone storage section 142. The power control schedule storage section 141 stores therein the power control schedule received from the input unit 4, and the power control time zone storage section 142 stores therein a start time and an end time in the power control time zone written by the job execution scheduling table generating section 11. It should be noted that the power control schedule stored in the power control schedule storage section 141 indicates a schedule of power control to be carried out by the power control unit 1. For example, the start time and the end time in the power control time zone are respectively set to 18:00 and 23:00 from Monday to Friday, while they are respectively set to 13:00 and 18:00 on Saturday. This is merely one example, and therefore, the power control schedule is not limited to the above-described example.

Figure 3:
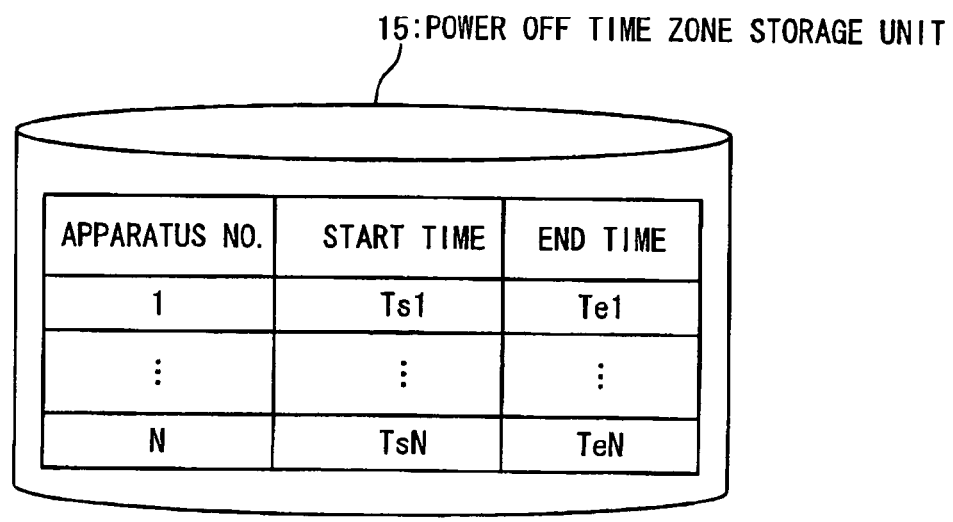
FIG. 3 is a diagram showing a power off permission time zone storage unit in the power control system of the first embodiment.
Figure 4:
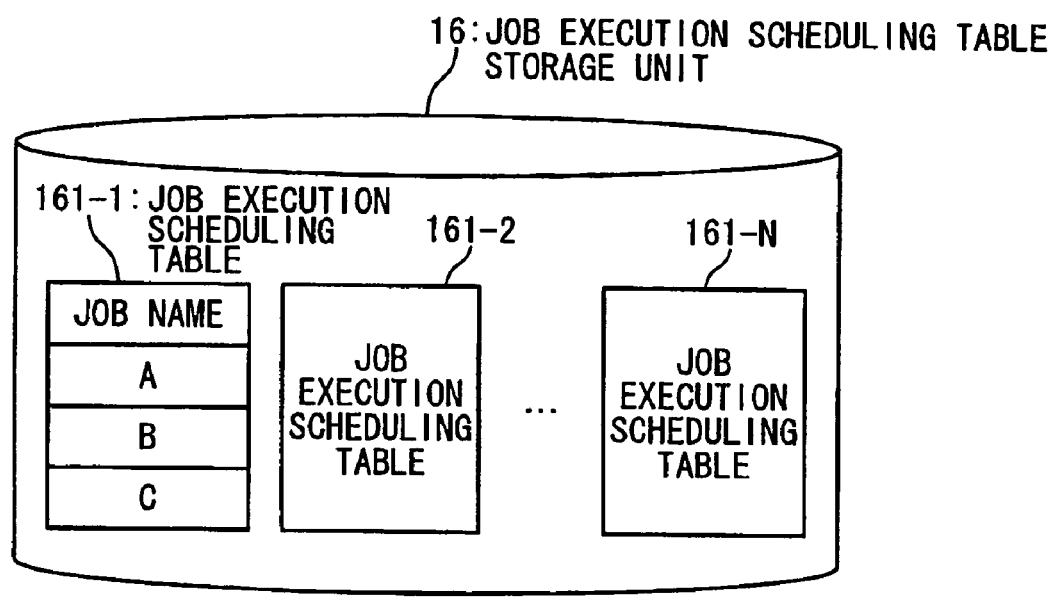
FIG. 4 is a diagram showing a job execution scheduling table storage unit in the power control system of the first embodiment.

The power off permission time zone storage unit 15 stores therein the start time and the end time in the power off permission time zone for each of the power control target apparatuses 3-1 to 3-N, received from the input unit 4. FIG. 3 is a diagram showing an example of the power off permission time zone storage unit 15. As shown in FIG. 3, the start time and the end time in the power off permission time zone are respectively designated by Ts1 and Te1 in the power control target apparatus 3-1 having an apparatus number "1", and the start time and the end time in the power off permission time zone are respectively designated by TsN and TeN in the power control target apparatus 3-N having an apparatus number "N". As shown in FIG. 4, the job execution scheduling table storage unit 16 stores therein job execution scheduling tables 161-1 to 161-N for each of the power control target apparatuses 3-1 to 3-N.

The job execution scheduling table generating section 11 has the following functions:

of setting the start time and the end time in the power control time zone used in a current power control process in the power control time zone storage section 142 when the display of the timer 17 reaches the start time in the power control time zone shown in the power control schedule stored in the power control schedule storage section 141;

of registering the names of jobs being executed by the job executing units 2-1 to 2-X at the start time in the power control time zone and the names of jobs scheduled, on the job execution scheduling tables for the power control target apparatuses used by the jobs; and of issuing a power on command to the power control target apparatus corresponding to the job execution scheduling table, in which the names of the jobs are registered.

The job execution scheduling table updating section 12 has the function of deleting the name of the job from the job execution scheduling table every time the job is completed in each of the job executing units 2-1 to 2-X.

The power off judging section 13 has a function of issuing the power off command to the power control target apparatus under the condition that no name of a job is stored in the job execution scheduling table and a current time falls within the power off permission time zone for the power control target apparatus assigned to the job execution scheduling table, when the job execution scheduling table updating section 12 deletes the name of the job from the job execution scheduling table.

The power control unit 1 having the above-described functions may be implemented by, for example, a computer. In such a case, a disk, a semiconductor memory or other recording mediums are provided to record therein a program for allowing the computer to serve as the power control unit 1, and the above-described program is read and executed by the computer. The computer controls its own operation in accordance with the read program, to implement the job execution scheduling table generating section 11, the job execution scheduling table updating section 12 and the power off judging section 13 on its own computer.

Next, the operation of the power control system in the first embodiment will be described below in detail.

First of all, an administrator inputs the power control schedule and the start time and the end time in the power off permission time zone for each of the power control target apparatuses 3-1 to 3-N from the input unit 4. As a consequence, the power control schedule is stored in the power control schedule storage section 141 in the control data storage unit 14, and further the start time and the end time in the power off permission time zone for each of the power control target apparatuses 3-1 to 3-N are stored in the power off permission time zone storage unit 15. If the job execution scheduling table generating section 11 determines based on the timer 17 that the current time reaches the start time in the power control time zone shown in the power control schedule stored in the power control schedule storage section 141, the job execution scheduling table generating section 11 carries out a process shown in a flowchart of FIG. 5.

First, the job execution scheduling table generating section 11 determines the start time and the end time in the power control time zone, which are used in the current power control process based on the power control schedule stored in the power control schedule storage section 141 and the current time indicated by the timer 17, and then stores the determined the start and end times in the power control time zone storage section 142 (step S51).

Subsequently, the job execution scheduling table generating section 11 issues an inquiry to each of the job executing units 2-1 to 2-X, and acquires the name of the job being executed in each of the job executing units 2-1 to 2-X and the apparatus number of the power control target apparatus used by the job. Then, the job execution scheduling table generating section 11 registers the acquired job name in the job execution scheduling tables specified by the above-described apparatus numbers of the job execution scheduling tables 161-1 to 161-N for the power control target apparatuses 3-1 to 3-N (step S52). For example, assuming that the job execution scheduling table generating section 11 acquires a job name "A" from the job executing unit 2-1 and apparatus numbers "1" and "N" of the power control target apparatuses used by the above-described job, the job execution scheduling table generating section 11 registers the job name "A" in the two job execution scheduling tables 161-1 and 161-N.

Subsequently, the job execution scheduling table generating section 11 issues an inquiry to each of the job executing units 2-1 to 2-X, and acquires the name of each of the jobs to be executed by the job executing units 2-1 to 2-X during the power control time zone and the apparatus number of the power control target apparatuses used by the jobs. Then, job execution scheduling table generating section 11 registers the acquired job name in the corresponding job execution scheduling table (step S53).

Subsequently, the job execution scheduling table generating section 11 issues a power on command to the power control target apparatuses used by the jobs whose names are registered in the job execution scheduling tables 161-1 to 161-N, out of the power control target apparatuses 3-1 to 3-N (step S54). A power source 31-i in the power control target apparatuses 3-i ($1 \leq i \leq N$), to which the power on command is issued, is turned on. Upon completion of the process at the step S54, the job execution scheduling table generating section 11 starts the job execution scheduling table updating section 12 (step S55).

Figure 6:
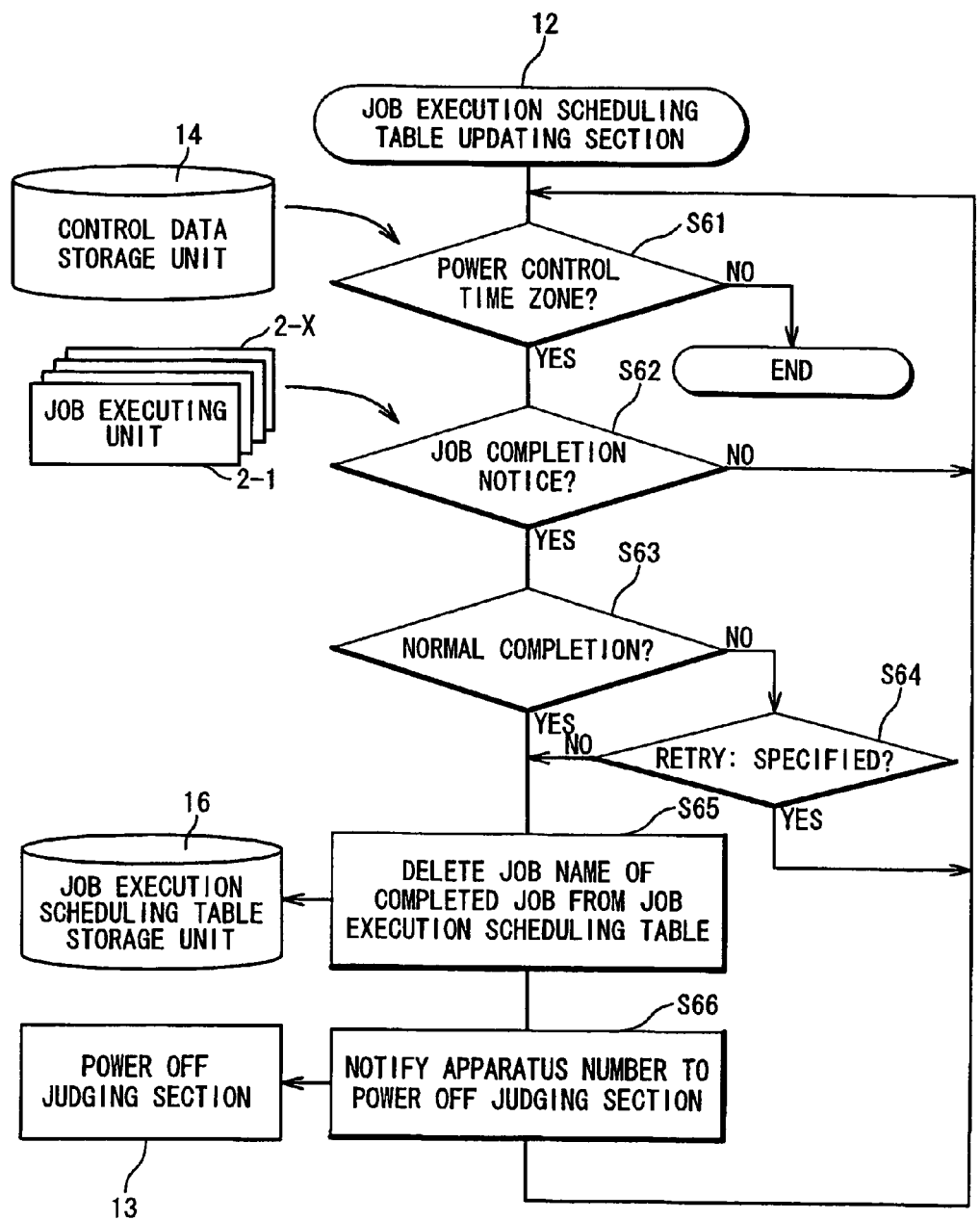
FIG. 6 is a flowchart showing an operation of a job execution scheduling table updating section in the power control system of the first embodiment.

Consequently, the job execution scheduling table updating section 12 starts a process shown in a flowchart of FIG. 6. The job execution scheduling table updating section 12 receives a job completion notice from any of the job executing units 2-1 to 2-X every time the job is completed. The job completion notice contains the name of the completed job, the apparatus number (one or more) used by the job and completion data on whether or not the job has been normally completed. When the job execution scheduling table updating section 12 receives the job completion notice from the job executing unit 2-j ($1 \leq j \leq X$) during the power control time zone registered in the power control time zone storage section 142 (YES in both of steps S61 and S62), the job execution scheduling table updating section 12 checks whether or not the completion data contained in the job completion notice indicates the normal completion (step S63).

In case of the normal completion (YES at a step S63), the job execution scheduling table updating section 12 deletes the job name contained in the job completion notice from all of the job execution scheduling tables corresponding to the apparatus number contained in the job completion notice (step S65), and further notices the power off judging section 13 of all of the apparatus numbers contained in the job completion notice (step S66). Thereafter, the processing is returned to step S61.

In contrast, if the completion notice indicates an abnormal completion (NO at a step S63), the job execution scheduling table updating section 12 issues an inquiry to the job executing unit 2-j serving as a noticer of a retry of the job which has been abnormally completed. In response to the inquiry, the job executing unit 2-j responds whether or not the job is retried.

If the job executing unit 2-j responds that the job is retried (YES at a step S64), the job execution scheduling table updating section 12 returns to the processing at the step S61. To the contrary, if the job executing unit 2-j responds that no job is retried (NO at the step S64), the above-described process at the step S65 is carried out.

While the current time of the timer 17 falls within the power control time zone (YES at a step S61), the job execution scheduling table updating section 12 repeats the above-described process. If the current time falls out of the power control time zone (NO at a step S61), the job execution scheduling table updating section 12 completes the above-described process. In the meantime, the power off judging section 13 carries out a process shown in a flowchart of FIG. 7 when the power off judging section 13 is noticed of the apparatus number by the job execution scheduling table updating section 12.

First of all, the power off judging section 13 pays an attention to one of the apparatus numbers noticed by the job execution scheduling table updating section 12 (step S71). Subsequently, the power off judging section 13 examines or checks whether or not the job name has been registered by referring to the job execution scheduling table corresponding to the apparatus number out of the job execution scheduling tables 161-1 to 161-N stored in the job execution scheduling table storage unit 16 (step S73).

If the job name is registered (NO at a step S73), the power off judging section 13 executes the process of the step S71. In contrast, if no job name is registered (YES at a step S73), the power off judging section 13 reads out the start time and the end time in the power off permission time zone registered in correspondence to the noted apparatus number from the power off permission time zone storage unit 15, and then checks whether or not the current time falls within the power off permission time zone (step S74).

If the current time falls out of the power off permission time zone (NO at a step S74), the power off judging section 13 executes the process of the step S71. In contrast, if the current time falls within the power off permission time zone (YES at a step S74), the power off judging section 13 issues a power off command to the power control target apparatus having the noted apparatus number (step S75), and then the power off judging section 13 returns to the process of the step S71.

The power off judging section 13 repeats the above-described process until the process is ended over all the apparatus numbers. If there is no apparatus number (NO at a step S72), the power off judging section 13 completes the process.

Figure 8:
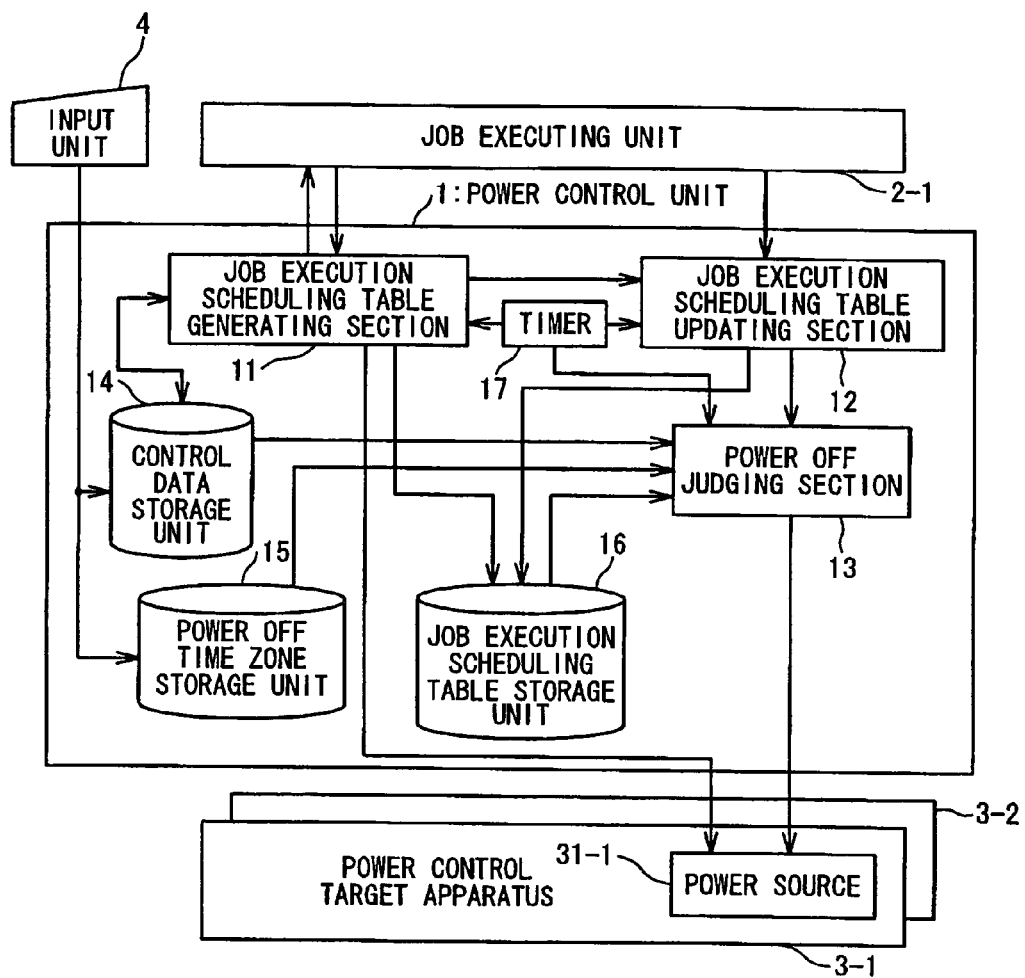
FIG. 8 is a block diagram showing an example of the power control system of the first embodiment.

Next, the operation of the power control system in the first embodiment will be described below in detail. Now, as shown in FIG. 8, it is assumed that one job executing unit 2-1 and two power control target apparatuses 3-1 and 3-2 are connected to the power control unit 1. Also, it is assumed that the power control schedule storage section 141 in the control data storage unit 14 and the power off permission time zone in the storage unit 15 are shown in FIGS. 9A and 9B, respectively, and that FIG. 9C is a diagram showing a schedule of the job executing unit 2-1.

Figure 5:
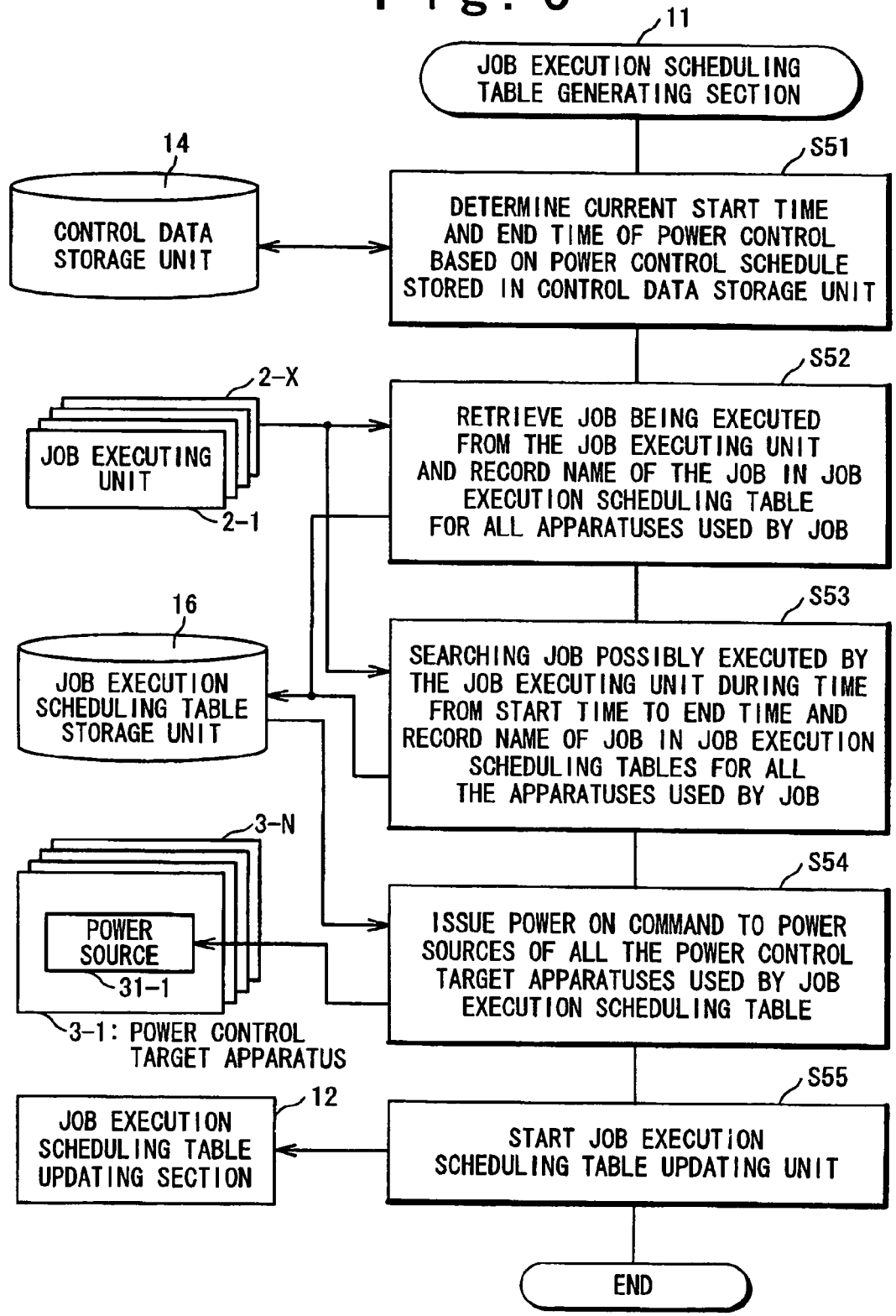
FIG. 5 is a flowchart showing an operation of a job execution scheduling table generating section in the power control system of the first embodiment.

In this case, when the job execution scheduling table generating section 11 determines that the current time reaches the start time in the power control time zone based on the power control schedule stored in the power control schedule storage section 141 and the current time indicated by the timer 17, the job execution scheduling table generating section 11 carries out the process shown in the flowchart of FIG. 5. In the example shown in FIG. 9A, since the start time in the power control time zone is set to 18:00 every day, the job execution scheduling table generating section 11 starts the process shown in the flowchart of FIG. 5 at 18:00.

Since the start time and the end time in the power control time zone are set to 18:00 and 23:00 every day at step S51, the start time and the end time in the power control time zone used in the current power control processing are determined to be 18:00 and 23:00, respectively. The determined start and end times "18:00" and "23:00" are stored in the power control time zone storage section 142.

Figures 10, 11:
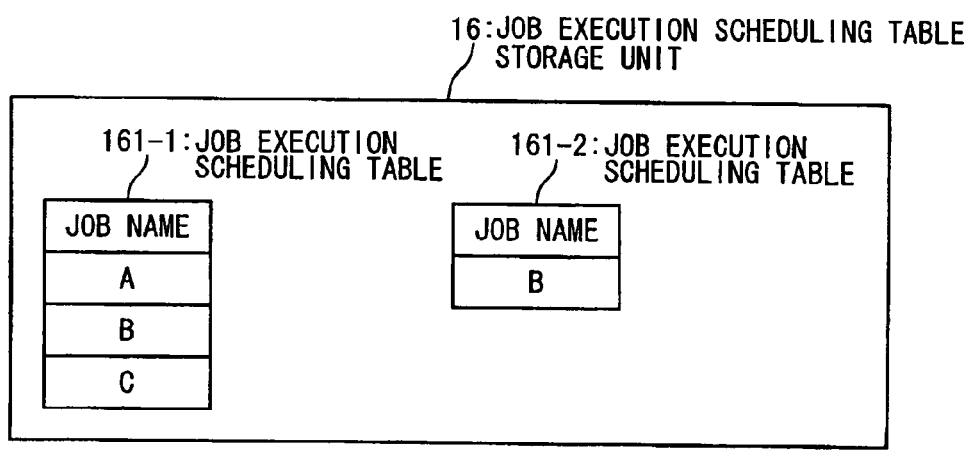
FIG. 10 is a diagram showing one example of a job execution result.
FIG. 11 is a diagram showing the job execution scheduling table storage unit in the power control system of the first embodiment.

At the next step S52, the job executing unit 2-1 issues an inquiry of the name of the job being executed currently (i.e., at the start time "18:00" in the power control time zone) and the apparatus number of the power control target apparatus used by the job. For example, it is assumed that the job executing unit 2-1 executes the job having the name "A" (also, to be referred to as the "job A") at the start time "18:00" in the power control time zone, as shown in FIG. 10, the job executing unit 2-1 returns the job name "A" and the apparatus number "1" to the job execution scheduling table generating section 11 in response to the above inquiry. In other words, as shown in FIG. 9C, since the job A uses the power control target apparatus 3-1 having the apparatus number "1", the job executing unit 2-1 returns the job name "A" and the apparatus number "1" to the job execution scheduling table generating section 11. As a consequence, the job execution scheduling table generating section 11 stores the job name "A" in the job execution scheduling table 161-1 specified by the apparatus number "1" out of the job execution scheduling tables 161-1 and 161-2 stored in the job execution scheduling table storage unit 16, as shown in FIG. 11.

In the next step S53, the job executing unit 2-1 issues an inquiry of a name of a job to be started and the apparatus number of the power control target apparatus used by the job during the power off permission time zone "from 18:00 to 23:00". Referring to FIG. 9C, the job executing unit 2-1 is scheduled to execute a job B, which uses the power control target apparatus 3-1 and 3-2 having the apparatus numbers "1" and "2", respectively, and a job C, which uses the power control target apparatus 3-1 having the apparatus number "1", in the power control time zone. Therefore, the job executing unit 2-1 returns a combination of the job name "B" with the apparatus numbers "1" and "2" and a combination of the job name "C" with the apparatus number "1" to the job execution scheduling table generating section 11. In this manner, the job execution scheduling table generating section 11 registers the job name "B" in the job execution scheduling tables 161-1 and 161-2 corresponding to the apparatus numbers "1" and "2" based on the combination of the job name "B" with the apparatus numbers "1" and "2", and further registers the job name "C" in the job execution scheduling table 161-1 corresponding to the apparatus number "1", as shown in FIG. 11.

At the next step S54, the power on command is issued to the power control target apparatus 3-1 and 3-2. At the step S55, the job execution scheduling table updating section 12 is started. The job execution scheduling table updating section 12 starts the process shown in the flowchart of FIG. 6 when it is started to be operated by the job execution scheduling table generating section 11.

The job executing unit 2-1 sends the job completion notice to the job execution scheduling table updating section 12 upon every completion of the job. As shown in FIG. 10, it is assumed that the job A is normally completed at "19:00", the job executing unit 2-1 sends to the job execution scheduling table updating section 12, the job completion notice including the job name "A", the apparatus number "1" of the power control target apparatus 3-1 used by the job A and the completion data indicating the normal completion.

When the job execution scheduling table updating section 12 receives the job completion notice from the job executing unit 2-1 (YES at the step S62), the job name "A" is deleted from the job execution scheduling table 161-1 corresponding to the apparatus number "1" (step S65), and further the job execution scheduling table updating section 12 is noticed of the apparatus number "1" (step S66) since the completion data contained in the job completion notice indicates "the normal completion" (YES at the step S63). Thereafter, the job execution scheduling table updating section 12 returns to the processing at the step S61.

Figure 7:
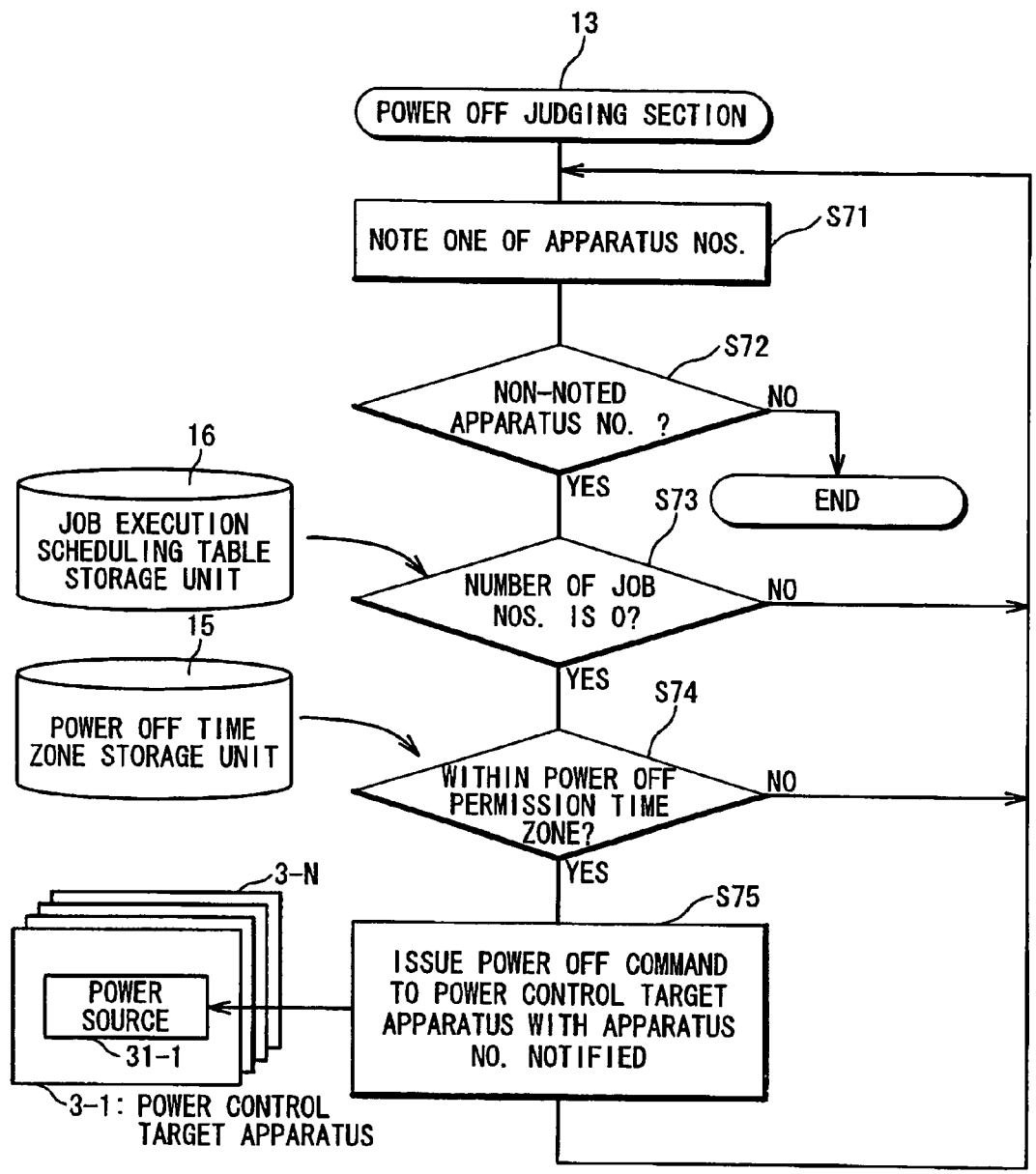
FIG. 7 is a flowchart showing an operation of a power off judging section in the power control system of the first embodiment.

When the power off judging section 13 is noticed of the apparatus number "1", the power off judging section 13 examines and checks whether or not the job name is registered in the job execution scheduling table 161-1 corresponding to the apparatus number "1" (steps S71 to S73), as shown in the flowchart of FIG. 7. At this time, the job names "B" and "C" are registered in the job execution scheduling table 161-1, and further, there is no not noted apparatus number (NO at a step S73 and N) at a step S72). Thus, the power off judging section 13 completes the processing.

Thereafter, if the job C is abnormally completed at "20:20", as shown in FIG. 10, the job executing unit 2-1 sends the job completion notice including the job name "C", the apparatus number "1" and completion data indicating "the abnormal completion" to the job execution scheduling table updating section 12. When the job execution scheduling table updating section 12 receives the job completion notice from the job executing unit 2-1 (YES at the step S62 in FIG. 6), the completion data included in the job completion notice indicates "the abnormal completion" and the job C is a retrial job, so that the job execution scheduling table updating section 12 returns to the processing at the step S61.

Thereafter, if the job B is normally completed at "22:00", as shown in FIG. 10, the job executing unit 2-1 sends the job completion notice including the job name "B", the apparatus numbers "1" and "2" and the completion data indicating "the normal completion" to the job execution scheduling table updating section 12. When the job execution scheduling table updating section 12 receives the job completion notice from the job executing unit 2-1 (YES at the step S62 in FIG. 6), the completion data contained in the job completion notice indicates "the normal completion" (YES at the step S63), so that the job name "B" is deleted from the job execution scheduling tables 161-1 and 161-2 corresponding to the apparatus numbers "1" and "2" (step S65), and further the power off judging section 13 is noticed of the apparatus numbers "1" and "2" (step S66). Thereafter, the power off judging section 13 returns to the processing at a step S61.

When the power off judging section 13 is noticed of the apparatus numbers "1" and "2" by the job execution scheduling table updating section 12, it pays an attention to one of the apparatus numbers "1" and "2" (e.g., the apparatus number "1"). Thereafter, the power off judging section 13 examines and checks whether or not the job name is registered in the job execution scheduling table 161-1 corresponding to the noted apparatus number "1" (steps S71 to S73). Since the job name "C" is registered in the job execution scheduling table 161-1 at this time (NO at the step S73), the power off judging section 13 pays an attention to a next apparatus number (e.g., the apparatus number "2"), and then examines and checks whether or not the job name is registered in the job execution scheduling table 161-2 corresponding to the noted apparatus number "2" (step S73). At this time, since no job name is registered in the job execution scheduling table 161-2 (YES at the step S73), the power off judging section 13 examines and checks whether or not the current time falls within the power off permission time zone in the power control target apparatus 3-2 (step S74). In this case, since the current time is "22:00" and the power off permission time zone in the power control target apparatus 3-2 is "from 18:00 to 23:00" (YES at the step S74), the power off judging section 13 issues the power off command to the power control target apparatus 3-2 (step S75). Thereafter, the power off judging section 13 returns to the processing at the step S71. However, the power off judging section 13 completes the processing since there is no not-noted apparatus number.

Thereafter, if the job C is normally completed at "22:30", as shown in FIG. 10, the job executing unit 2-1 sends the job completion notice including the job name "C", the apparatus number "1" and the completion data indicating "the normal completion" to the job execution scheduling table updating section 12. When the job execution scheduling table updating section 12 receives the job completion notice from the job executing unit 2-1 (YES at the step S62 in FIG. 6), the completion data contained in the job completion notice indicates "the normal completion" (YES at the step S63), so that the job name "C" is deleted from the job execution scheduling table 161-1 corresponding to the apparatus number "1", and further, the power off judging section 13 is noticed of the apparatus number "1" (steps S65 and S66). Thereafter, the power off judging section 13 returns to the processing at the step S61.

When the power off judging section 13 is noticed of the apparatus number "1", the power off judging section 13 examines and checks whether or not the job name is registered in the job execution scheduling table 161-1 corresponding to the apparatus number "1" (steps S71 to S73 in FIG. 7). At this time, since no job name is registered in the job execution scheduling table 161-1 (YES at a step S73), the power off judging section 13 examines and checks whether or not the current time falls within the power off permission time zone in the power control target apparatus 3-1 (step S74). In this case, since the current time is "22:30" and the power off permission time zone in the power control target apparatus 3-1 is "from 18:00 to 23:00" (YES at a step S74), the power off judging section 13 issues the power off command to the power control target apparatus 3-1 (step S75). Thereafter, since a judgment result at the step S72 is NO, the power off judging section 13 ends the processing.

In accordance with the above-described processing, the power control target apparatus 3-1 is turned off at "22:30": in contrast, the power control target apparatus 3-2 is turned off at "22:00".

In the first embodiment, it is possible to securely prevent any situation in which the power source is turned off during the execution of the job, and further, to save any unnecessary consumption of the electric power, because the power control system includes: the job execution scheduling table generating section 11 for registering the name of the job being executed at the start time in the power control time zone and the names of the jobs to be scheduled at that timing in the job execution scheduling table in the power control target apparatus used by the job; the job execution scheduling table updating section 12 for deleting the name of the job from the job execution scheduling table in the power control target apparatus used by the job every time the job is completed; and the power off judging section 13 for turning off the power source of the power control target apparatus assigned to the job execution scheduling table when the number of jobs registered in the job execution scheduling table becomes zero.

Additionally, according to the first embodiment, the power control target apparatus can independently set the time zone, during which the power source is turned off, because the power control system includes the power off permission time zone storage unit 15 which registers therein the power off permission time zone in each of the power control target apparatus.

Second Embodiment

The power control system according to the second embodiment of the present invention will be described. The power control system in the second embodiment has one feature in that power control target apparatus to be used by a job is turned on immediately before the job is executed by the job executing unit.

Figure 12:
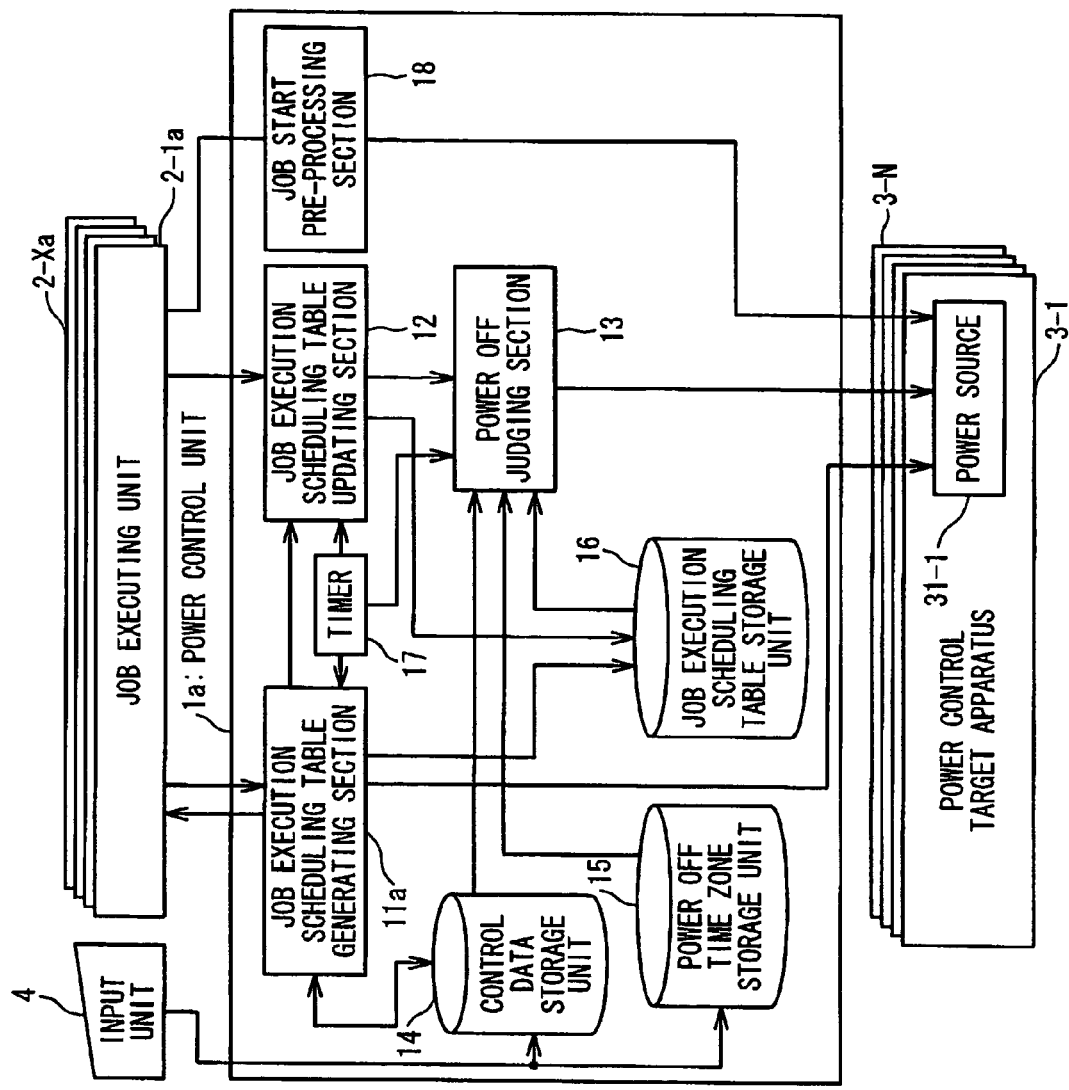
FIG. 12 is a block diagram showing a configuration of the power control system according to a second embodiment of the present invention.

FIG. 12 is a block diagram showing the configuration of the power control unit 1a in the second embodiment. The power control unit 1a is different from the power control unit 1 shown in FIG. 1 in that the power control unit 1a includes an job execution scheduling table generating section 11a in place of the job execution scheduling table generating section 11, a job start pre-processing section 18, and job executing units 2-1a to 2-Xa connected thereto in place of the job executing units 2-1 to 2-X.

Each of the job executing units 2-1a to 2-Xa has the function of noticing the job start pre-processing section 18 of the apparatus number of the power control target apparatus to be used by the job in advance to a job execution start time by a predetermined time in addition to the function possessed by each of the job executing units 2-1 to 2-X. Here, the above-described predetermined time needs be longer than a time after the power on command is issued to the power control target apparatus until the power control target apparatus becomes usable by turning on the power source in the power control target apparatus, but it should be desirably as short as possible.

The job execution scheduling table generating section 11a has the same function as that of the job execution scheduling table generating section 11 except that it has no function of issuing the power on command to the power control target apparatus.

The job start pre-processing section 18 has the function of issuing the power on command to the power control target apparatus having the apparatus number noticed by the job executing units 2-1a to 2-Xa.

It should be noted that the power control unit la can be also implemented by a computer. The power control unit 1a is implemented by the computer, for example, as follows: it is provided with a disk, a semiconductor memory or other recording mediums, which records therein a program for allowing the computer to serve as the power control unit 1a, and the above-described program is read out by the computer. The computer controls its own operation in accordance with the read program, so as to implement the job execution scheduling table generating section 11a, the job execution scheduling table updating section 12, the power off judging section 13 and the job start pre-processing section 18 on its own computer.

Next, an operation of the power control system in the second embodiment will be described in detail. Here, the description will be made on only the operation different from that in the first embodiment.

Figure 13:
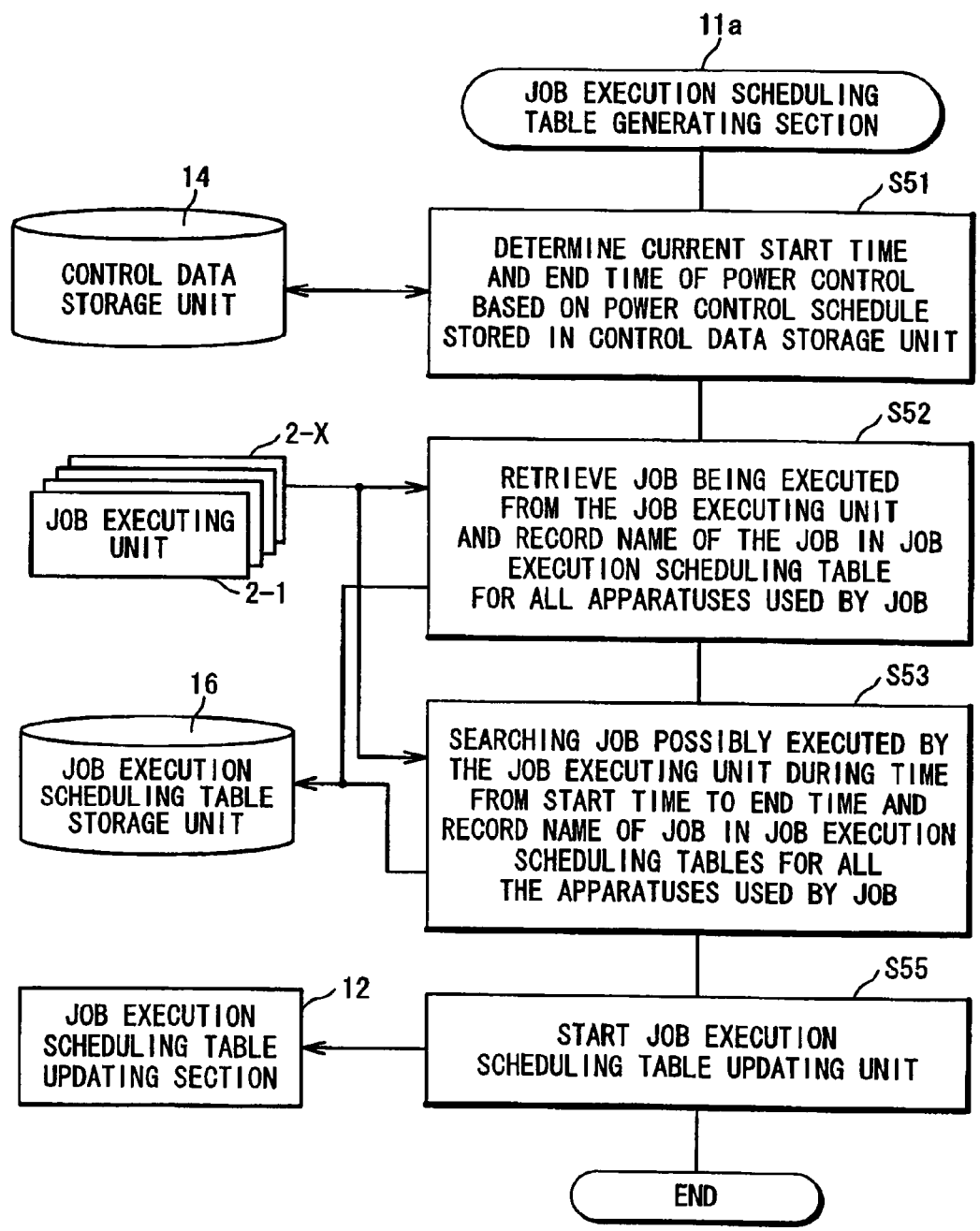
FIG. 13 is a flowchart showing an operation of an job execution scheduling table generating section in the power control system of the second embodiment.
Figure 14:
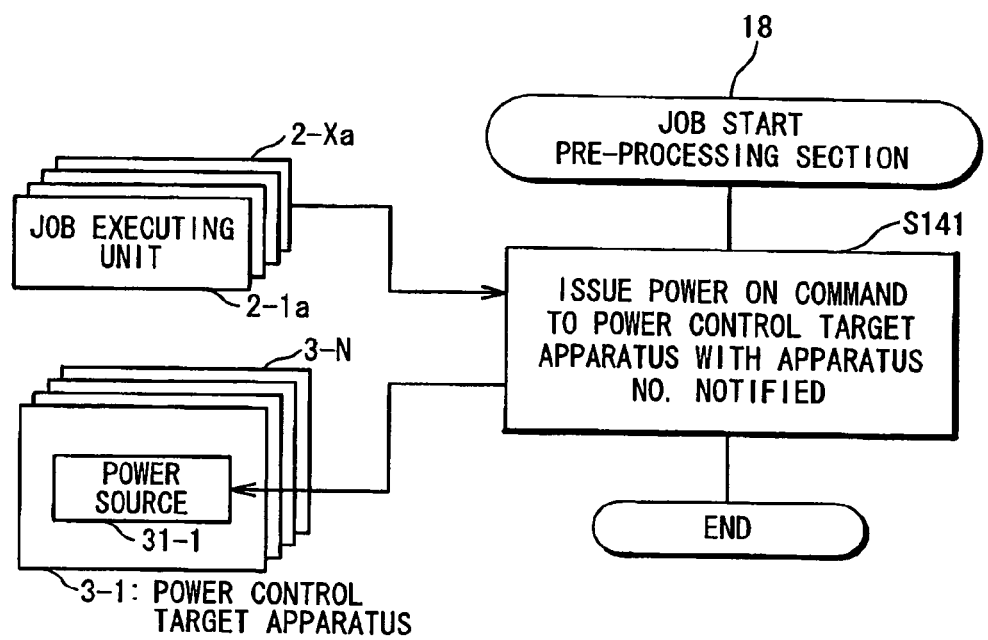
FIG. 14 is a flowchart showing an operation of a job start pre-processing section in the power control system of the second embodiment.

FIG. 13 is a flowchart showing an example of processing of the job execution scheduling table generating section 11a. A difference from the flowchart showing the processing of the job execution scheduling table generating section 11 shown in FIG. 5 is in only omission of step S54, and therefore, its description will be omitted below. Each of the job executing units 2-1a to 2-Xa notices the job start pre-processing section 18 of the apparatus number of the power control target apparatus to be used by the job in advance by the predetermined time before the job execution start time. The job start pre-processing section 18 issues the power on command to the power control target apparatus having the apparatus number when it is noticed of the apparatus number by the job executing units 2-1a to 2-Xa (step S141), as shown in a flowchart of FIG. 14. Thereafter, a power source of the power control target apparatus, which has received the power on command, is turned on. It should be noted that when the power source has been already turned on, the above-described command is ignored.

In the second embodiment, any unnecessary consumption of the electric power can be remarkably saved in addition to the effects in the first embodiment.

The present invention can be applied to concentrated backup of a plurality of personal computers at night. In addition, the present invention can be applied to automatic power source turning off of a job server which has completed the job.

As described above, according to the present invention, it is possible to securely prevent any situation in which the power source is turned off during the execution of the job. Also, it is possible to save any unnecessary consumption of the electric power.

What is claimed is:

1. A power control system, comprising:
    power control target units, each of which has a power source and is used by at least one of jobs;
    job executing units configured to execute said jobs; and
    a power control unit configured to control said power source of each of said power control target units based on execution results of said jobs by said job executing units,
    wherein said power control unit comprises:
    a job execution scheduling table generating section configured to generate a job execution scheduling table for each of said power control target units based on a control data, such that said job executing units execute said jobs in said job execution scheduling tables;
    a job execution scheduling table updating section configured to delete a job name of each of said jobs from said job execution scheduling tables when execution of said job is completed, and output a job completion notice; and
    a power off judging section configured to control said power sources of said power control target units used by said job to be turned off in response to said job completion notice.

2. The power control apparatus according to claim 1, wherein said control data includes a power control schedule and power control start and end time, and
    said job execution scheduling table stores an identifier number of each of said power control target units used by said job, scheduled start and end times of execution of said job, and said job name.

3. The power control apparatus according to claim 2, wherein said power off judging section does not carry out the control of said power sources of said power control target units used by said job to be turned off when a time at which said job completion notice is received is out of a range of a power off permission start time to a power off permission end time.

4. The power control apparatus according to claim 2, wherein said power off judging section controls said power sources of said power control target units used by said job to be turned off when a time at which said job completion notice is received is in a range of a power off permission start time to a power off permission end time.

5. The power control apparatus according to claim 2, further comprising a job start pre-processing section configured to control said power source of said power control target unit to be turned on when execution of said job corresponding to said power control target unit is started.

6. A power control method, comprising:
    executing each of jobs based on a job execution scheduling table corresponding to said job;
    using power control target units with power sources in each of the jobs;
    setting a start time and an end time of a power control schedule in a power control time zone; and
    controlling said power source of each of said power control target units when between the start time and the end time of the power control schedule, to power off based on execution results of said jobs by said job executing units; and
    storing a starting time and end time in a power off permission time zone storage unit in a power off permission time zone for each of the power control target units,
    wherein the power off judging section does not turn off said power sources of said power control target units when a current time falls within a power off permission time zone for the respective power control target unit.

7. The power control method according to claim 6, further comprising:
    deleting a job name of each of said jobs from said job execution scheduling tables when execution of said job is completed; and
    issuing said job completion notice.

8. The power control method according to claim 7, wherein said executing each of jobs comprises generating said job execution scheduling table for each of said power control target units.

9. The power control method according to claim 8, further comprising control data including a power control schedule and power control start and end time, and
    said job execution scheduling table stores an identifier number of each of said power control target units used by said job, scheduled start and end times of execution of said job, and a job name.

10. The power control method according to claim 7, wherein said controlling said power source comprises:
    issuing a job completion notice when execution of each of said jobs is completed; and
    keeping said power sources of said power control target units used by said job when a time at which said job completion notice is received is out of a range of a power off permission start time to a power off permission end time.

11. The power control method according to claim 7, wherein said controlling said power source comprises:
    issuing a job completion notice when execution of each of said jobs is completed; and
    controlling said power sources of said power control target units used by said job to be turned off in response to said job completion notice.

12. The power control method according to claim 7, wherein said controlling said power source comprises:
    issuing a job completion notice when execution of each of said jobs is completed; and
    controlling said power sources of said power control target units used by said job to be turned off when a time at which said job completion notice is received is in a range of a power off permission start time to a power off permission end time.

13. The power control method according to claim 7, further comprising:
    controlling said power source of said power control target unit to be turned on when execution of said job corresponding to said power control target unit is started.

14. A computer-readable software product tangibly embodying machine readable code to accomplish a method for realizing a power control, the method comprising:
    executing each of jobs based on a job execution scheduling table corresponding to said job;
    using power control target units with power sources in each of the jobs;
    setting a start time and an end time of a power control schedule in a power control time zone; and controlling said power source of each of said power control target units when between the start time and the end time of the power control schedule, to power off, based on execution results of said jobs by said job executing units.

15. The computer-readable software product according to claim 14, wherein said method further comprises:
deleting a job name of each of said jobs from said job execution scheduling tables when execution of said job is completed; and
issuing said job completion notice.

16. The computer-readable software product according to claim 15, wherein said controlling said power source of said method comprises:
issuing a job completion notice when execution of each of said jobs is completed; and
keeping said power sources of said power control target units used by said job when a time at which said job completion notice is received is out of a range of a power off permission start time to a power off permission end time.

17. The computer-readable software product according to claim 15, wherein said controlling said power source of said method comprises:
issuing a job completion notice when execution of each of said jobs is completed; and
controlling said power sources of said power control target units used by said job to be turned off in response to said job completion notice.

18. The computer-readable software product according to claim 15, wherein said controlling said power source of said method comprises:
issuing a job completion notice when execution of each of said jobs is completed; and
controlling said power sources of said power control target units used by said job to be turned off when a time at which said job completion notice is received is in a range of a power off permission start time to a power off permission end time.

19. The computer-readable software product according to claim 15, wherein the method further comprises:
controlling said power source of said power control target unit to be turned on when execution of said job corresponding to said power control target unit is started.

* * * * *